United States Patent [19]

Arnold

[11] Patent Number: 4,490,656

[45] Date of Patent: Dec. 25, 1984

[54] OVERLOAD PROTECTION IN A MOTOR CONTROL SYSTEM

[75] Inventor: Bruce E. Arnold, Clinton, N.J.

[73] Assignee: The Singer Company, Stamford, Conn.

[21] Appl. No.: 509,482

[22] Filed: Jun. 30, 1983

[51] Int. Cl.³ .................. H02K 23/68; H02P 7/00
[52] U.S. Cl. ............................ 318/434; 318/476; 318/798; 318/799; 318/800; 318/805; 318/806; 112/277; 112/275
[58] Field of Search ........... 318/434, 476, 798, 799, 318/800, 805, 806, 269, 255; 361/28, 29, 30, 31; 112/277, 275, 121.11, 200

[56] References Cited

U.S. PATENT DOCUMENTS

| | | | |
|---|---|---|---|
| 4,104,978 | 8/1978 | Takahashi et al. | 112/277 |
| 4,109,288 | 8/1978 | Berenson | 318/806 X |
| 4,161,921 | 7/1979 | Nishida et al. | 112/275 |
| 4,195,585 | 4/1980 | Takahashi et al. | 112/277 |
| 4,249,117 | 2/1981 | Leukhardt et al. | 318/476 X |
| 4,322,668 | 3/1982 | Trussler et al. | 318/476 X |
| 4,338,556 | 7/1982 | Hetzel | 318/434 X |
| 4,345,196 | 8/1982 | Hanyu et al. | 112/275 X |
| 4,355,274 | 10/1982 | Bourbeau | 318/805 X |
| 4,379,986 | 4/1983 | Baxter et al. | 318/434 |
| 4,388,570 | 6/1983 | Sangree | 318/255 |
| 4,394,606 | 7/1983 | Woerwag | 318/798 X |
| 4,400,657 | 8/1983 | Nola | 318/798 |

Primary Examiner—J. V. Truhe
Assistant Examiner—Paul Shik Luen Ip
Attorney, Agent, or Firm—David L. Davis; Robert E. Smith; Edward L. Bell

[57] ABSTRACT

A microcomputer-based motor control system provides overload protection by incrementing a register whenever a full power condition exists and decrementing the register when less than a full power condition exists. When the register reaches a predetermined value, this indicates an overload condition.

1 Claim, 2 Drawing Figures

OVERLOAD PROTECTION IN A MOTOR CONTROL SYSTEM

DESCRIPTION

1. BACKGROUND OF THE INVENTION

This invention relates to motor control systems and, more particularly, to overload protection in such a system.

Overload protection in a motor control system is typically accomplished by providing circuitry to sense and monitor the current through the motor. However, when a motor controller is implemented by a programmed microcomputer, it is desirable to minimize the amount of necessary hardware, or circuitry, and provide as many functions as possible in the software. It has been found that the position of current sensing circuitry in a microcomputer based motor control system can as much as double the cost of the circuitry. It is therefore an object of this invention to provide overload protection in a motor control system which does not require any additional circuitry.

2. SUMMARY OF THE INVENTION

The foregoing and additional objects are attained in accordance with the principles of this invention by providing overload protection in a motor control system which includes a phase control circuit connected between the motor and a cyclically varying power supply. According to this invention, motor overload is defined as a condition where full power is applied to the motor for an excessive period of time. Accordingly, the power into the motor is continually monitored by checking the conduction angle of the phase control circuit. Whenever a full power condition exists, a timer up-ramping cycle is initiated, otherwise the up-ramp is reversed to a down-ramp. When the ramp reaches a defined overload threshold, power to the motor is cut off.

BRIEF DESCRIPTION OF THE DRAWINGS

The foregoing will be more readily apparent upon reading the following description in conjunction with the drawings wherein.

DETAILED DESCRIPTION

Figure 1:
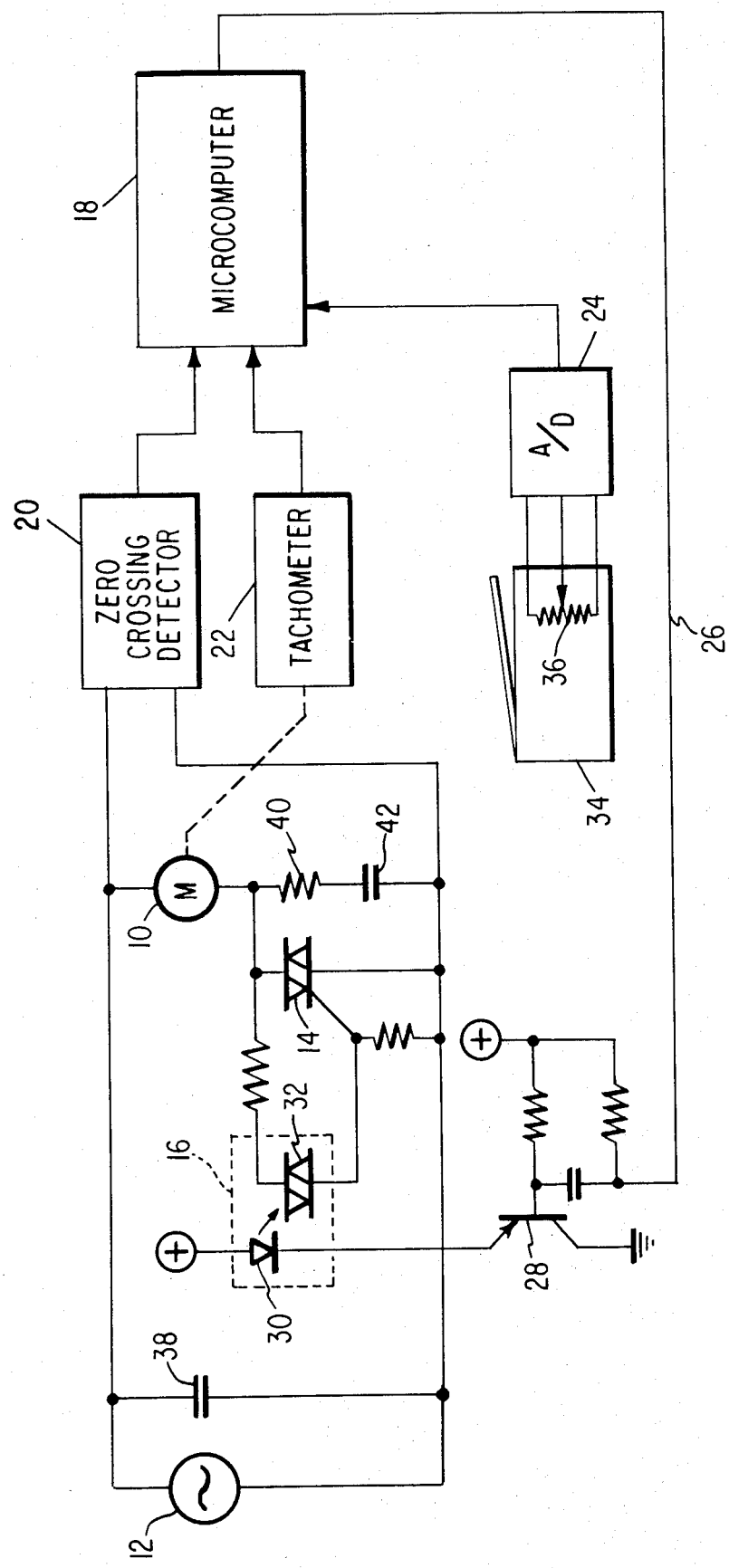
FIG. 1 is a schematic block diagram of a microcomputer based motor control system operating in accordance with the principles of this invention.

Referring now to the drawings, FIG. 1 shows a motor 10 connected to a cyclically varying power supply 12 which may be commercially available AC power. Connected between the motor 10 and the power supply 12 is a phase control circuit including a triac 14 and a firing circuit including opto-isolator 16 coupled to the phase control circuit for firing the triac 14 to supply power to the motor 10 during a portion of the cycle of the power supply 12. This firing is under the control of the microcomputer 18 which operates in accordance with inputs from the zero crossing detector 20, the tachometer 22, and the analog to digital converter 24, to apply signals at appropriate times to the lead 26 to cause the transistor 28 to be turned on. When the transistor 28 turns on, current flows through the diode 30 in the opto-isolator 16 to allow the photosensitive element 32 to conduct and trigger the triac 14.

The speed of the motor 10 is controlled in response to signals received from the analog to digital converter 24. The input of the analog to digital converter 24 is illustratively a foot controller 34, such as is utilized with sewing machines. Inside the foot controller 34 is a potentiometer 36 having a movable tap, as is well known in the art. This potentiometer 36 is connected to the input of the analog to digital converter 24. The actual speed of the motor 10 is sensed by a tachometer 22 mechanically coupled to the motor 10. The tachometer 22 supplies actual speed signals to the microcomputer 18. The zero crossing detector 20 is coupled to the power supply 12 and provides synchronizing signals to the microcomputer 18 at all of the zero crossings, both positive going and negative going, of the power supply 12. The capacitor 38 connected across the power supply 12 acts as a filter. The snubber, or commutating, network including the resistor 40 and the capacitor 42 controls the rate of rise of voltage across the triac 14 when it turns off, due to the inductive effects of the motor 10, so that the triac 14 doesn't turn back on until it is triggered.

According to the present invention, overload of the motor 10 is defined as a condition where full power is applied to the motor for an excessive period of time. Since the microcomputer 18 controls the conduction angle of the triac 14 in accordance with a comparison of the desired speed signal received from the analog to digital converter 24 and the actual speed signal received from the tachometer 22, the microcomputer 18 has all of the data necessary for determining whether the motor is in an overload condition. In particular, an internal register within the microcomputer 18 is incremented whenever a full power condition exists and decremented otherwise. When the register reaches a predetermined value, this indicates an overload condition and power to the motor is cut off until the foot controller is relaxed. Timing is such that a time delay of about 2 seconds is provided before the overload threshold is reached.

Figure 2:
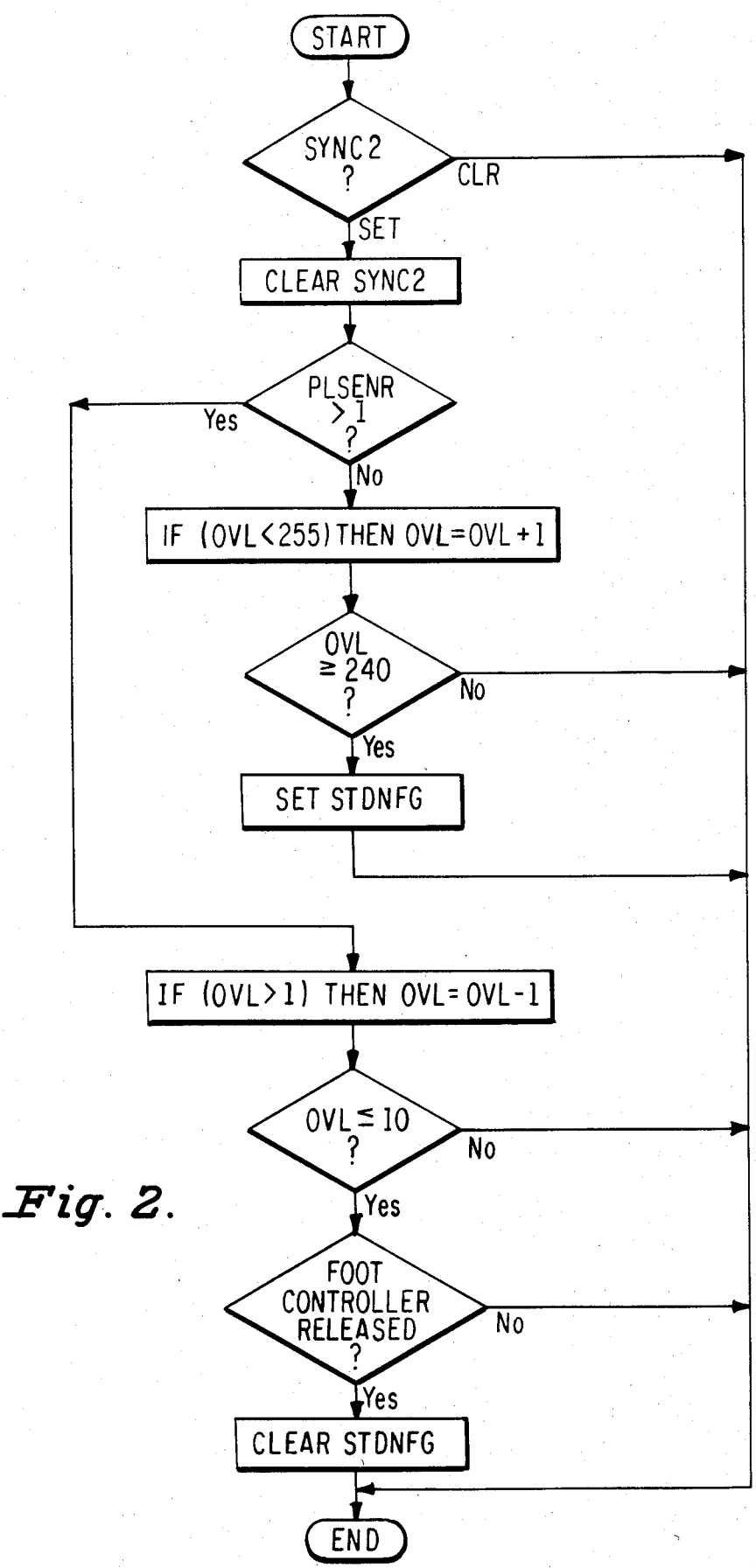
FIG. 2 is a flowchart of a subroutine for operating the microcomputer of FIG. 1 in accordance with the principles of this invention.

The APPENDIX to this specification illustrates a subroutine for operating the microcomputer 18 in accordance with the principles of this invention and FIG. 2 is a flowchart for this subroutine. Before describing this subroutine, certain mnemonics utilized therein will be defined. SYNC2 is a flag which is set at every zero crossing of the power supply 12, as determined by the zero crossing detector 20. Since the power supply 12 is conventionally a 60 hertz commercially available power source, SYNC2 is set 120 times per second. PLSENR is a register which contains a digital representation of the conduction angle of the triac 14. Specifically, full conduction of the triac 14 is represented by PLSENR containing the value 1, with lower conduction angles of the triac 14 being represented by higher values of PLSENR. OVL is the overload ramp register which is incremented and decremented in accordance with the principles of this invention and reaches a maximum value of 240 before power to the motor 10 is cut off. STDNFG is a shut down flag set by the microcomputer 18 when power to the motor 10 is to be cut off. SREFR is a speed reference register which indicates the condition of the foot controller 34 (i.e., a digital representation of the position of the movable tap of the potentiometer 36).

Whenever the SYNC2 flag is set, it is first cleared and then the PLSENR register is examined to determine the conduction angle of the triac 14. If PLSENR is greater than 1, this indicates that there is less than full conduction of the triac 14 and the OVL register is decremented by 1. If the OVL register is less than or equal to 10, the SREFR speed reference register is examined to determine whether the foot controller 34 has been released. If so, the STDNFG shut down flag is cleared. In the event that the PLSENR register is not greater than 1, this indicates that full power is being applied to the motor 10. In such case, the OVL register is incremented. If the OVL register contents are greater than or equal to 240, the STDNFG flag is set, causing shutdown of the motor 10 until the foot controller 34 is subsequently released.

Accordingly, there has been disclosed a method for providing overload protection in a motor control system. It is understood that the above-described embodiment is merely illustrative of the application of the principles of this invention. Numerous other embodiments may be devised by those skilled in the art without departing from the spirit and scope of this invention, as defined by the appended claims. For example, although a programmed microcomputer has been disclosed, this invention may also be practiced with a hardwired control system.

APPENDIX

| LABEL | INSTR. | MODIFIER | COMMENTS |
|---|---|---|---|
| SHUT0 | RES | 0 | |
| | JPCLR | SYNC2,SHUT9 | BYPASS ROUTINE |
| | BITCLR | SYNC2 | RESET SYNC FLAG |
| | MOVLW | .1+.1 | OVERLOAD LIMITT IS 1 |
| | SUBFW | PLSENR,W | F-W PLSENO-2 |
| | BC | SHUT4 | NO OVERLOAD |
| | INCF | OVL | OVERLOAD: BUMP UP |
| | SKPNZ | . | NO OVERFLOW |
| | DECF | OVL | BUMP BACK TO 255 |
| | MOVLW | .240 | UPPER LIMIT REACHED? |
| | SUBWF | OVL,W | F-W OVL-240 |

APPENDIX -continued

| LABEL | INSTR. | MODIFIER | COMMENTS |
|---|---|---|---|
| | SKPC | . | YES |
| | RETLW | 0 | ELSE QUIT |
| | BITSET | STDNFG | SET SHUTDOWN FLAG |
| | RETLW | 0 | |
| SHUT4 | DECF | OVL | NO OVERLOAD: BUMP DOWN |
| | SKPNZ | . | NO UNDERFLOW |
| | INCF | OVL | BUMP BACK TO 1 |
| | MOVLW | .10 | LOWER LIMIT REACHED? |
| | SUBWF | OVL,W | F-W OVL-10 |
| | SKPNC | . | YES |
| | RETLW | 0 | ELSE QUIT |
| | MOVF | SREFR,1 | CHECK FOOT CONTROL |
| | SKPNZ | . | NOT RELEASED |
| | BITCLR | STDNFG | ELSE, RESET FLAG |
| SHUT9 | RETLW | 0 | |

I claim:

1. In a motor control system for operating a motor from a cyclically varying power supply at preselected speeds including a phase control circuit connected between said motor and said power supply, and a firing circuit coupled to said phase control circuit for phase firing said phase control circuit to supply power to said motor during a portion of the cycle of said power supply, a method for preventing overload of said motor comprising the steps of:

(a) providing an electrical representation of a variable;
(b) examining the magnitude of the cycle portion repetitively at a fixed, regular, time interval; and
 (b1) increasing said variable representation when said cycle portion exceeds a predetermined threshold; or
 (b2) decreasing said variable representation when said cycle portion does not exceed said predetermined threshold, said variable representation being incapable of being decreased below a fixed minimum; and
(c) preventing the application of power to said motor when said variable representation reaches a predetermined value.

* * * * *